United States Patent
Auernhammer

(10) Patent No.: US 7,975,090 B2
(45) Date of Patent: Jul. 5, 2011

(54) METHOD FOR EFFICIENT I/O CONTROLLER PROCESSOR INTERCONNECT COUPLING SUPPORTING PUSH-PULL DMA READ OPERATIONS

(75) Inventor: Florian Auernhammer, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 12/498,899

(22) Filed: Jul. 7, 2009

(65) Prior Publication Data

US 2011/0010480 A1    Jan. 13, 2011

(51) Int. Cl.
*G06F 3/00* (2006.01)
*G06F 13/36* (2006.01)

(52) U.S. Cl. .......................... 710/308; 710/22

(58) Field of Classification Search .................. 710/308
See application file for complete search history.

(56) References Cited

U.S. PATENT DOCUMENTS

| | | | |
|---|---|---|---|
| 2004/0139305 A1* | 7/2004 | Arimilli et al. | 712/227 |
| 2006/0259648 A1* | 11/2006 | Agarwala et al. | 710/5 |

* cited by examiner

*Primary Examiner* — Chun-Kuan Lee
*Assistant Examiner* — Brooke J Dews
(74) *Attorney, Agent, or Firm* — Scully, Scott, Murphy & Presser, P.C.; Stephen Kaufman, Esq.

(57) ABSTRACT

A system for I/O controller-processor interconnect coupling supporting a push-pull DMA read operation, in one aspect, may comprise a processor interconnect comprising a plurality of caches and memory subsystems and an I/O controller coupled with the processor interconnect. The I/O controller may comprise a plurality of DMA read request queues, a DMA read slot pool comprising a plurality of DMA read slots, and an expander logic determining a priority of requests in said request queues.

11 Claims, 6 Drawing Sheets

METHOD FOR EFFICIENT I/O CONTROLLER PROCESSOR INTERCONNECT COUPLING SUPPORTING PUSH-PULL DMA READ OPERATIONS

BACKGROUND OF THE INVENTION

1. Field of the Invention

The present invention is generally related to an input/output (I/O) controller in a computer system, and in particular to a method efficiently allocating direct memory access (DMA)-read slots in the I/O controller.

2. Description of Related Art

Multi-core processors increase pressure on the memory subsystem causing more simultaneous requests to the memory controller and thus necessitating deeper queues inflicting higher latencies. I/O controller initiated data-push is one option for reducing latency in the I/O path of future systems. In future systems, dedicated hardware may be present in the processing units and the I/O controller to push payload data into I/O devices. Thus the latency created by going back and forth over an external bus such as Hyper-Transport or GX may be reduced.

At the same time, the effects of data origin of direct memory access (DMA)-read data fetches in the processor interconnect are getting more and more important. However, in the current systems the architecture of the processor interconnect in terms of resources and latencies cannot be taken into account by the I/O devices. This is due to the I/O devices lacking necessary information on the data origin of DMA-read data fetches. The I/O devices also need to be independent of the processor architecture to be usable on different architectures and provide standardized external bus protocols such as Peripheral Component Interconnect (PCI).

Currently, the I/O controllers use the same techniques as processing units in handling DMA-read data fetches in snooping-based and directory-based cache coherent systems due to the need to interfacing with the processor interconnect. However, the I/O devices' requirements for executing DMA-read requests differ substantially from that of the processing units. For example, the processing units require in-order execution of read requests and extensively use inexact prefetching. Many times, even though these requirements increase cache hit rates, they cause lots of overhead on the processor interconnect and increase latency for DMA-read requests. On the other hand, the I/O related DMA-read requests can initiate exact prefetching, but the order of execution does not strictly need to be in-order. If possible, re-ordering can be used to optimize latency and external bus bandwidth.

I/O controller serves as a bridge between the processor interconnect and the external bus. Today, many I/O controllers use 1-to-1 request-to-slot mapping in handling DMA-read requests. The I/O controller features a number of DMA-read slots, each of which is responsible for handling one cache line (CL) on the internal processor interconnect. The processor interconnect may for example be a snooping based interconnect or a directory cache. I/O devices interface with the I/O controller DMA-read slots using either a low level protocol through an external bus, such as GX or HyperTransport, or through an intermediary such as a PCI-Host Bridge.

When DMA-read data is requested, the I/O device or the intermediary issues a request and is granted a credit for fetching data of one cache line associated with a DMA-read slot. The I/O device or the intermediary does not have knowledge of where the requested data is located in the processor interconnect, thus it cannot optimize the use of the external bus by re-ordering the sequence of execution of the requests. On the other hand, the processor interconnect does not have knowledge when further requests on consecutive cache lines may follow suit in the near future, which if taken into account, may help in reducing access latencies caused by repeated coherency policy enforcement.

The known I/O controller uses a 1-to-1 mapping scheme between the DMA read requests and the DMA read slots. The DMA read slots in the I/O controller are connected to the processor interconnect of the processor interconnect. The DMA read slots are connected with an arbitration unit. When a DMA read request is submitted to the I/O controller, a DMA read slot is directly connected to the issuer of the request, i.e. the I/O device or an intermediary device sends a request to the processor interconnect to fetch the data. The requested data is fetched using the processor interconnect and buffered in the DMA read slots. When multiple DMA read slots have data for transfer, the arbitration unit 140 determines the order in which the data is to be transferred on the external bus. The arbitration unit may be either directly connected with an I/O device through a low-level protocol such as a GX or HyperTransport bus protocol, or be connected with an intermediary device such as a PCI-Host Bridge.

For each request, the system provides one credit that can fetch one cache line. In the architecture of the known systems, the I/O devices do not have any knowledge about the would-be origin of the requested data, i.e., whether the data is in the memory or in the cache of a processing unit or in a victim cache. Similarly, the requestor does not provide any information to the I/O controller about whether its requests would require consecutive cache lines.

SUMMARY OF THE INVENTION

A system and method for I/O controller-processor interconnect coupling supporting push-pull DMA read operations are provided. The system in one aspect may comprise a processor interconnect comprising a plurality of processing units, caches, and memory subsystems. The system may further comprise an I/O controller coupled with the processor interconnect. The I/O controller may further comprise a plurality of DMA read request queues, a DMA read slot pool comprising a plurality of DMA read slots, and an expander logic determining a priority of requests in said request queues.

A method for push-pull DMA read operation based I/O controller-processor interconnect coupling, in one aspect, may comprise receiving a DMA read request and selecting a DMA read slot from a plurality to use as a scout slot. The method may also include causing the scout slot to send a request to a processor interconnect to determine data origin of the DMA read request, prioritizing the DMA read request according to the determined data origin of the DMA read request, and allocating one or more slot(s) of the plurality of slots in a DMA read slot pool according to the prioritizing.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

In one aspect, the system and method of the present disclosure may provide an efficient mechanism of the I/O controller for pushing data into I/O device. A method in one embodiment enables pre-fetching and optimizing latency. Latency generally refers to the time between initiating a request in the computer and receiving the answer. The method and system of the present disclosure may be utilized in DMA-reads on slow storage hierarchies such as the main memory or storage class memory in future systems and multi cache line reads.

For example, the system and method of the present disclosure may help in reducing latency for requests as well as optimizing DMA read slot usage. According to the system and method of the present disclosure in one embodiment, the decision about what data to fetch may be withheld as long as possible by the I/O-controller part making processor interconnect requests. Therefore, multiple requests for single-CL and multi-CL transfers may be pending in the I/O controller while being arbitrated to be assigned to a DMA read slot. Using the DMA read slots in this pooled manner may schedule the DMA read slots more intelligently. According to the system and method of the present disclosure in one embodiment, one or more expander slots are implemented to arbitrate the multi-CL transfers. Using those expander-slots with further information on the origin of the requested data, the number of slots assigned for the requests can be limited to the number necessary to guarantee the stream of data under normal conditions. At the same time a number of streams can be prepared for transfer in parallel and free slots can be used for single cache line requests.

Figure 1:
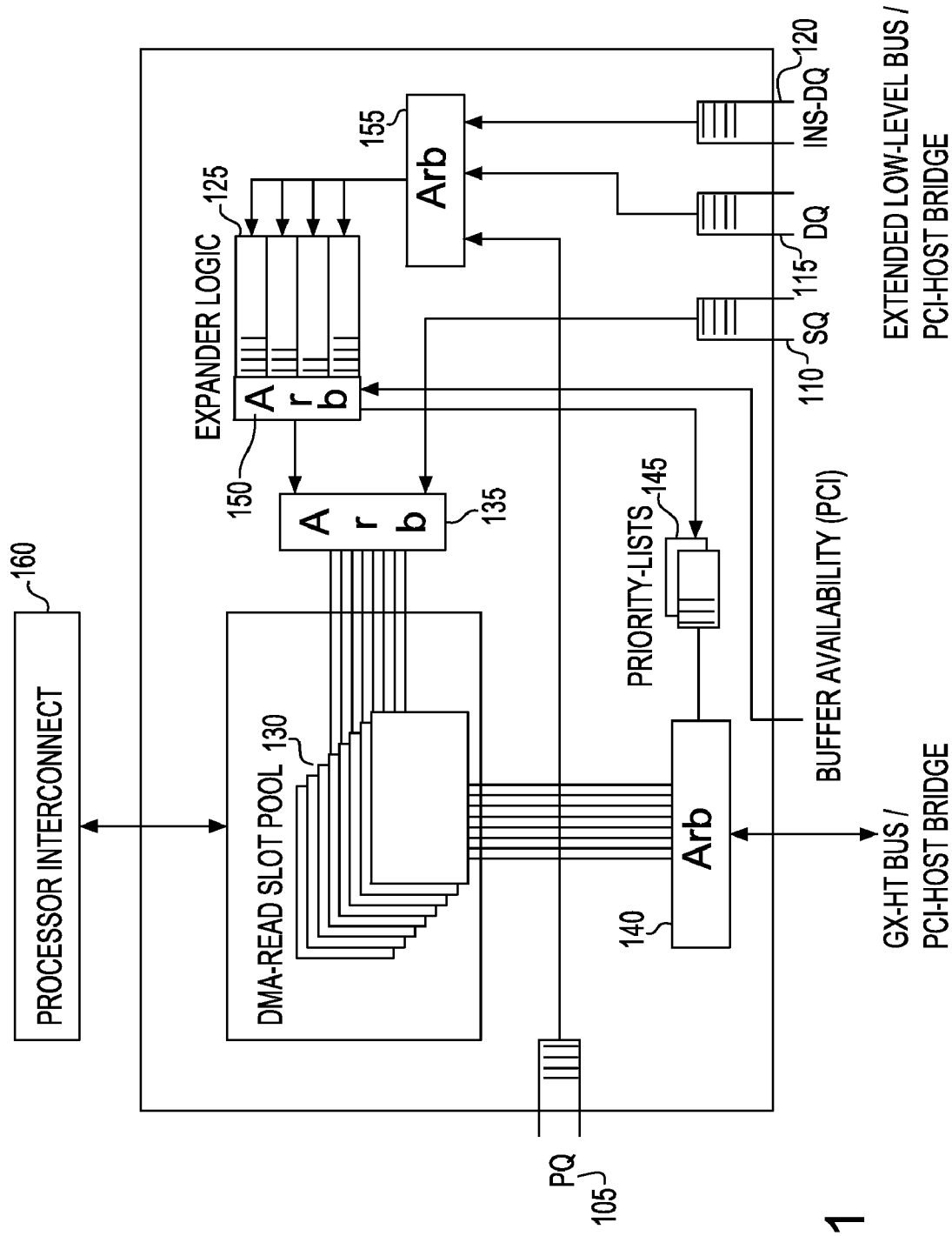
FIG. 1 is a block diagram of an I/O controller with improved DMA read slot handling according to an embodiment of the present invention.

FIG. 1 is a block diagram of an I/O controller with improved DMA read slot handling according to an embodiment of the present invention. Referring to FIG. 1, data requests are put into different request queues depending on the origin and the characteristics of each request. A push queue (PQ) 105 contains requests initiated from the system. A single queue (SQ) 110 contains requests that are satisfied by single cache line accesses for the requested data to be fetched from the processor interconnect. A device queue (DQ) 115 contains requests that are originated from an I/O device or an intermediary, which require multiple cache lines for the requested data to be fetched from the processor interconnect. An insertion device queue (INS-DQ) 120 contains requests that are also originated from an I/O device or an intermediary requiring multiple cache lines. However, active requests from INS-DQ 120 allow requests from other queues to be inserted ahead of them and served first. When requests from other queues are inserted, an active INS-DQ 120 request is deactivated and resumed after the completion of the inserted requests. The insertion process will be described in more detail below.

The PQ 105, DQ 115 and INS-DQ 120 are connected to an Arbiter 155. The Arbiter 155 works in connection with insertion and interleaving processes that will be described in more detail below. After being processed by Arbiter 155, the requests arrive at an Expander Logic 125. The Expander Logic 125 handles the multiple cache line (Multi-CL) requests by a process to be described in more detail below. Single CL requests created out of multi-CL requests by the expander logic 125 and the single cache line requests from SQ 110 are arbitrated in another Arbiter 135. The Arbiter 135 allocates the DMA read slots to the various requests. As opposed to the prior art systems, wherein the DMA read slots are pre-allocated to handle the requests separately, the DMA read slots in an embodiment of the present invention are pooled together in the DMA read slot pool 130. The system and method of the present disclosure in one embodiment allocates the DMA read slots to the DMA read requests depending on the data origin in the processor interconnect of the requested data. The allocation process of the DMA read slots will be described in more detail below with reference to FIG. 3.

The DMA read slot pool 130 is connected with the processor interconnect 160. After DMA read slots are allocated to the requests, the I/O controller fetches the data from the processor interconnect. When data is successfully fetched and buffered in a DMA read slot, it is to be transferred over the bus. An Arbiter 140 will decide the priority of transferring the data on the external bus according to one or more priority list(s) 145. The priority list(s) may be determined by an Arbiter 150 included in the Expander Logic 125 and further depend on an input indicating buffer availability when an intermediary device such as a PCI-Host Bridge is attached. PCI Express requests may span multiple cache lines. They are however transferred to the device as a whole. As the buffer space available in the PCI Express root complex may be limited, large requests may have to be finished before another one can be started. For this, the indication on buffer availability can signal, if a new request can be started, or if an older request needs to be finished first due to lack of buffer availability. The process of determining the bus utilization by the Arbiter 140 will be described in more detail below.

Figure 2A:
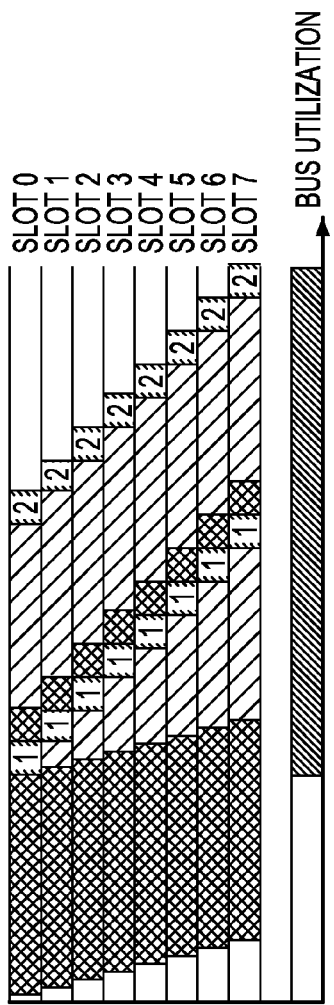
FIGS. 2A and 2B are diagrams illustrating an example comparing external bus latencies between an I/O controller in the prior art and an I/O controller according to an embodiment of the present invention.
Figure 2B:
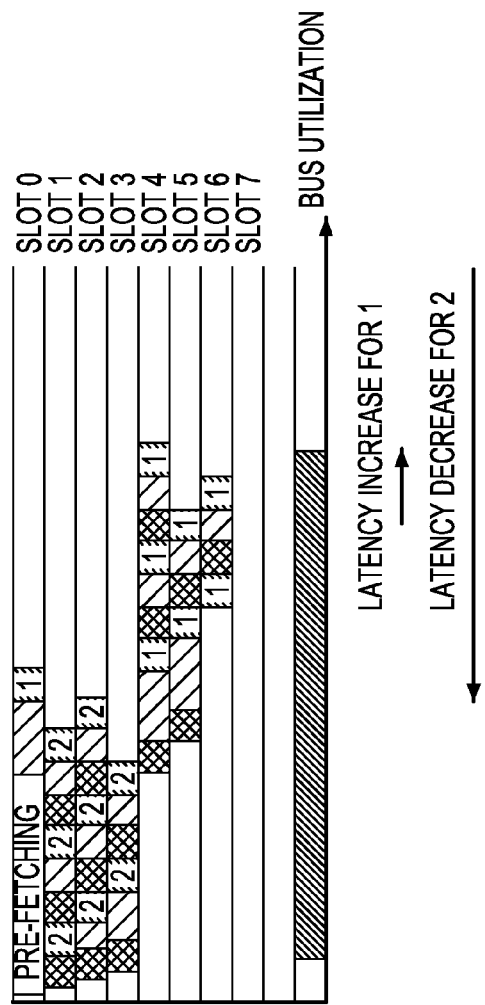

A method and system can, for example, reduce data latencies by utilizing the knowledge of the processor interconnect and the characteristics of the request. FIGS. 2A and 2B illustrate examples of a slot operation in known system (FIG. 2A) and the method and system of the present disclosure (FIG. 2B). Comparison of the operations shown in FIGS. 2A and 2B show how the system and method of the present disclosure can reduce data latencies. In the examples, two DMA read requests are issued from an external device. The data requested in the first request is in the memory and the data requested in the second request data is in cache, both of them requiring consecutive cache lines. Eight DMA read slots are available to transfers the data. As shown in FIG. 2A, the second request is kept waiting until all data for the first request has been fetched and transferred. Because the latency for fetching the data from memory is long, the second request has to wait even though it has a much shorter latency for its data stored in cache memory. Meanwhile, the bus is idle during the latency, thus bus also wastes its resources as all requests have been allocated to the first request by the device, which has no knowledge about the data origin.

FIG. 2B illustrates processing the same two requests according to an embodiment of the system and method of the present disclosure. Referring to FIG. 2B, when the first request hitting the memory is waiting for the first cache line to be fetched in slot 0, and the rest prefetched into a prefetch buffer in the processor (as for example described in EP 08101024.1), the second request that hits cache is pulled forward and processed in slots 1-3. After the transfer of the data for the second request is completed, the first packet data of the first request is transferred in slot 0, with rest of the packets transferred on slots 4-6. Thus, before the data for the memory hitting request is ready, the cache hitting request is served. While the memory data is available earlier, all transfers of the second request are served first, as the device needs all data to complete processing. As can be seen from FIGS. 2A and 2B, the latency for the second request is reduced significantly while latency for the first request only sees a slight increase. Furthermore, the bus utilization is also improved with its initial idling time reduced.

Figure 3:
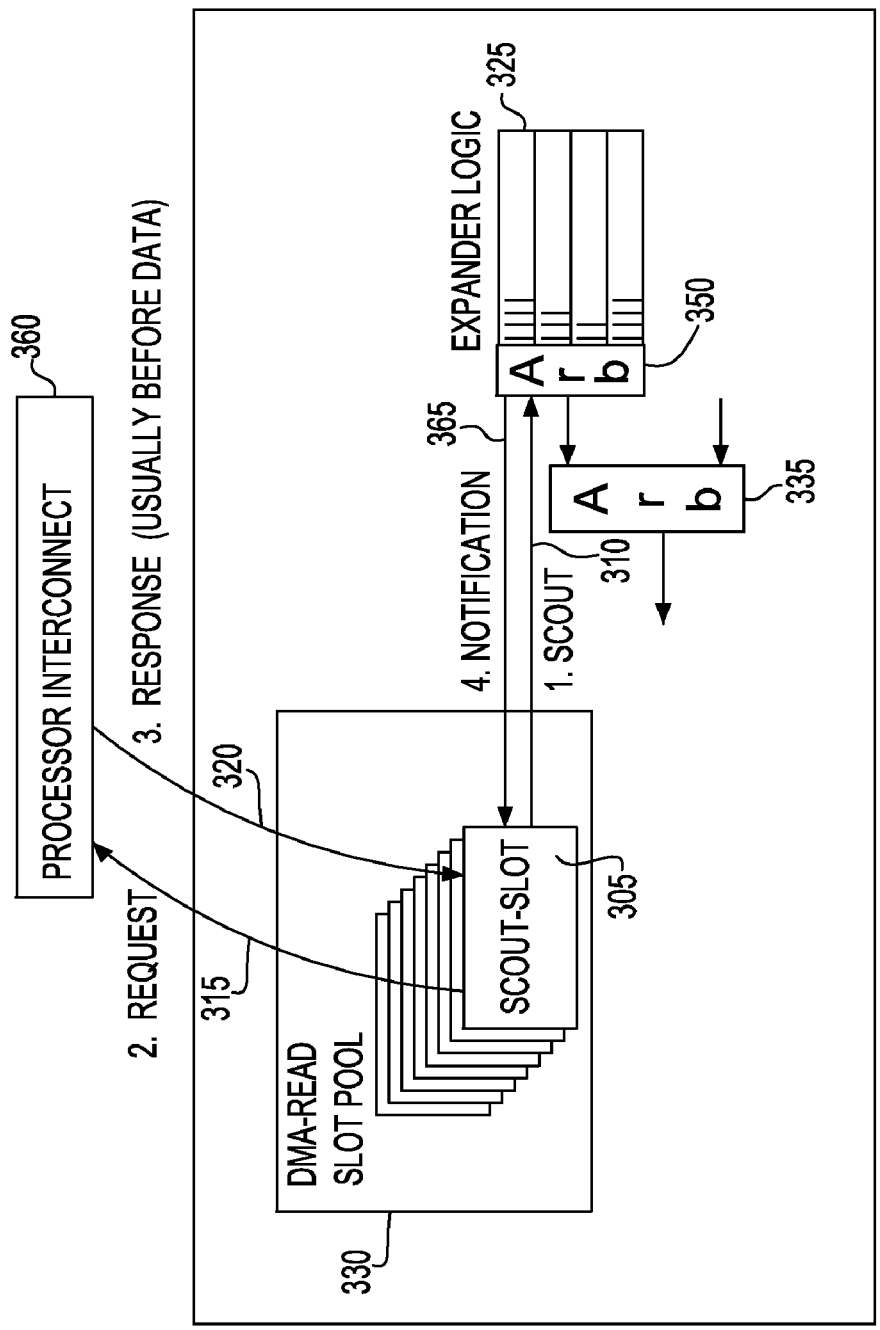
FIG. 3 is a block diagram illustrating a process of determining allocation of the DMA read slots in the pooled manner with respect to Multi-CL requests in one embodiment.

FIG. 3 is a block diagram illustrating a process of determining allocation of the DMA read slots in the pooled manner with respect to Multi-CL requests. Referring to FIG. 3, as shown at 310, the Expander Logic 325 uses the first DMA read request as a scout slot. The Scout Slot 305 is thus a normal DMA read slot 330, but the response from the processor interconnect is fed back to the expander logic. The Scout Slot 305 is named in the sense related to scout threads which try to fetch the cache lines that will most probably be needed for a program. Shown at 315, the Scout Slot 305 issues the Multi-CL request to the processor interconnect 360. Shown at 320, the processor interconnect 360 returns a response containing the data origin of the Multi-CL request in the processor interconnect. The data origin of the Multi-CL may be an L2 cache, an L3 cache or memory. These different responses are possibly returned from the processor interconnect 360. The data may be present in a processing unit cache or it may have to be fetched from main memory. If it resides in main memory, pre-fetching capabilities in the memory controller or a dedicated pre-fetch buffer might be available such that no more DMA read slots need to be scheduled for fetching the data until the pre-fetching process is completely or partially finished. If there are no pre-fetching possibilities available (at the moment) and in order to bridge the latency of the memory accesses, a bigger number of DMA-read slots needs to be allocated for the transfer.

The processor interconnect 360, for example, returns a response as to where the data is fetched from and if prefetching is used (shown at 320). In response to the scout-slot 305 receiving the response from the processor interconnect 360, and in contrast to the normal operation of a DMA read slot, the scout-slot 305 returns this information to the expander slot 325 as shown at 365. For example, the scout-slot 305 sends a notification of the origin of the requested data to the Expander Logic 325 as shown at 365.

This information is used in the Expander Logic 325 for determining the slot needs for streaming the multi-CL data out to the requesting external device. Based on the knowledge of the data origin, the Expander Arbiter 350 chooses an expander slot, which is then the active slot, which is given priority for sending data out to the external device and schedules DMA read slots in the DMA read slot pool 330 accordingly. Other expander slots that are working on multi cache line requests are inactive slots. They are only provided with a small number of DMA read slots for scouting and only if the active slot has been allocated enough DMA read slots. By using the knowledge of the data origin, the system and method of the present disclosure in one embodiment provides a slot scheduling method that takes into account the architecture of the processor interconnect.

To optimize the data transfers, one of the multi-cache line requests is chosen as "active". This means that empty DMA read slots are usually scheduled for transfers of the active stream. Inactive streams are scheduled in expander slots, but they only receive DMA read slots, if the active stream already has enough slots (as indicated in the scheduling table). If a new request arrives that has higher priority than the currently active stream, the new request is chosen as active stream, and the former active stream is now an inactive stream, until the new active stream has finished all transfers.

For example, while the data is fetched for the new active request, ready transfers from the former active stream are used to bridge the occurring gap until data for the new active request is ready. In the normal case, the number of slots may be enough to transfer the data without gaps on the external bus. If the data is delayed on the interconnect (e.g. due to contention), some transfers from the formerly active stream may be used to fill the gaps. The priority lists for the bus-arbiter are used to indicate the order in which the expander requests shall be scheduled on the bus.

Figures 4, 5:
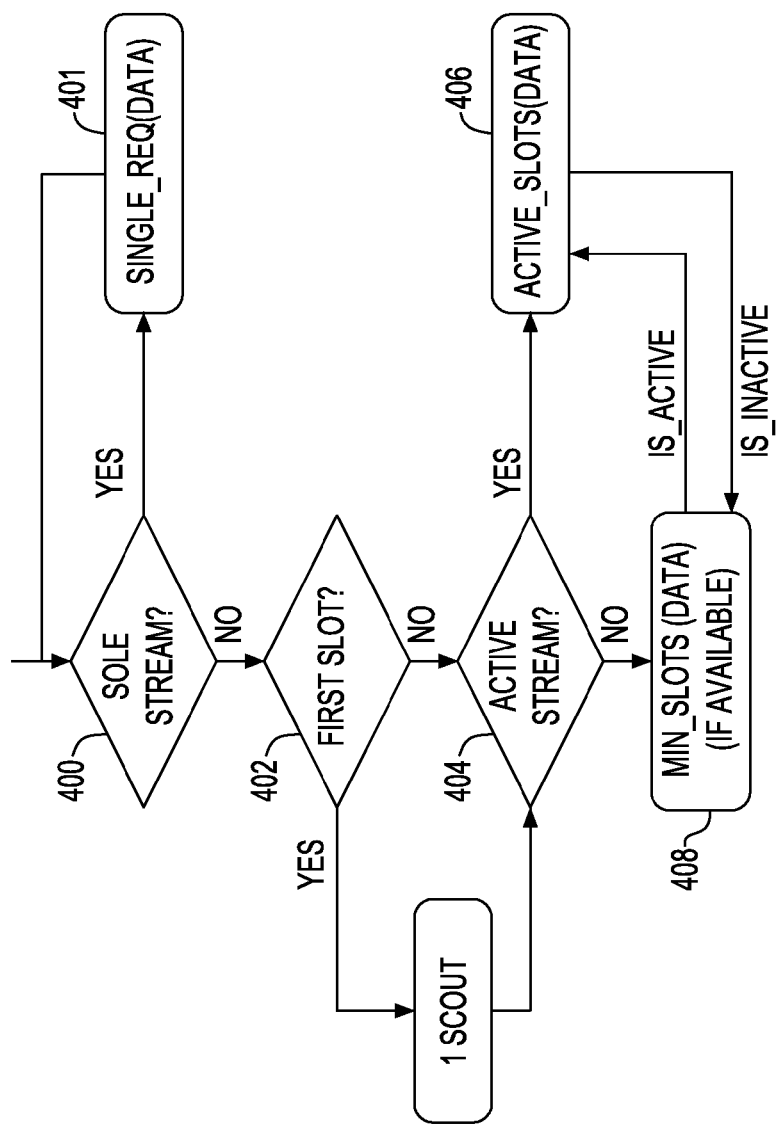
FIG. 4 illustrates the DMA read slot scheduling of the Expander Logic 325 according to one embodiment of the present invention.
FIG. 5 illustrates an example of an interconnect-architecture dependent allocation table.

FIG. 4 illustrates the DMA read slot scheduling of the Expander Logic 325 according to one embodiment of the present invention. Referring to FIG. 4, if a new stream is started in the expander slot 400, it is determined if it is the only stream, or if there are other streams pending. If it is the only stream, a number of DMA read slots 401 is allocated, according to the number defined for the system and the data origin, as shown in FIG. 5. If there is already a stream that is processed, which is the current active stream, or the stream was the sole stream and a new request has arrived, it is assured that the stream has had a scout slot 402 for determining the location of the referenced data. It can thereafter either be chosen 404 as new active stream 406, interleaving the old active stream, or it is kept inactive 408 until it is chosen as active stream after previous requests have been finished. While the stream is inactive, at most the minimum number of slots is allocated for the stream. If it is chosen as active, the I/O controller tries to always allocate the number of slots defined for an active slot.

If the data is in cache, it is allocated fewer slots than a stream that is present in memory without pre-fetching. This is, on the one hand, due to the fact that cache accesses are served faster and therefore less slots are needed to satisfy the full bus bandwidth. On the other hand, it takes into account the processing unit (PU) architecture, for example the number of available intervention machines. In one aspect, it may not make sense to allocate more DMA slots than there are available intervention machines in the PU as all further requests will see retry responses.

An example for this interconnect-architecture dependent allocation table is shown in FIG. 5. In the first column of the table in FIG. 5, the Expander Logic 325 allocates the DMA read slots according to the different origins of the data including L2 cache, L3 cache, memory supporting pre-fetch (Mem (prefetch)) and memory not supporting pre-fetch (Mem(direct)). The second column provides the number of DMA read slots allocated to inactive stream when available. The number of the DMA read slots allocated to the active stream is shown in the third column of the table. The fourth column shows the number of DMA read slots allocated when the request is the sole multi-CL request. It therefore serves as lookup table for the expander slots, taking into account the data origin, derived by the use of scout slots, and, at the same time, the scheduling state determined by the streams active in the different expander slots of the I/O controller.

According to the table shown in FIG. 5, if a stream is not active, the Expander Logic 325 tries to allocate a minimum number of slots shown in the second column of FIG. 5 according to the data origin if there are enough empty slots available. The logic for arbitration of the active stream also takes into account which queue a multi-CL request comes from, that is the push queue, the device queue or the insertion device queue. The queues are assigned different priorities.

Therefore, an active request from the insertion-device queue INS-DQ (FIG. 1. 120) may be retired (its state changed from active to inactive) and a request from the device queue DQ 115 or the push queue PQ 105 may be treated as the new active stream. Thus, higher-priority requests can overtake low-priority requests. Another indication can be considered for active-stream arbitration in a PCI Host-Bridge environment. There, a limited buffer space may be available for transfers in the PCI part. Therefore, a large transfer may have to be delayed or be processed uninterrupted in order to obtain enough buffer space in the PCI Host Bridge for successive transfers.

The number of slots allocated to one stream, i.e., active or not active, depends on the actual state of the stream and is adapted to the processor interconnect architecture. More specifically, if there is only one stream currently being requested, i.e., the request is in the SQ, more DMA read slots can be used for the stream as shown in the last column of FIG. 5. This over-allocation of resources is applied as latency optimization. It avoids that contention in the processor interconnect, increasing the data access latency, leads to an interruption of the data stream on the external bus. If there are multiple requests, when the requested data is present in the cache or memory supporting pre-fetching, it is sufficient if the number of DMA read slots is chosen such that a continued stream of data can be guaranteed in most of the cases as shown in the third column of FIG. 5. This number is dependent on the system architecture and can be easily determined by cycle accurate system simulations or by hardware measurements. Inactive streams will try to acquire a minimum number of slots, if free slots are available. The priority is usually given to allocation of at least one slot, used as scout slot, for every non-empty expander slot. If the latency for a data-fetch for the active stream is too big, such as when multiple processes contend for a processing unit cache or when the memory access takes too long, another DMA read slot for an inactive stream can fill in the gap on the bus. The number of allocated slots can also be changed dynamically during the data fetching process when a change in the data origin is detected, for example, if parts of the data are cast to L3. This mode of operation allows very easy integration and efficient usage of the pre-fetching capabilities of the system.

In an embodiment of the invention, when pre-fetching is triggered by the scout slot by issuing a multi-CL request to the processor interconnect, which either triggers a memory prefetch or is degraded into a single CL access, no more slots are allocated for the stream until data availability is signaled to the Expander Logic 325. This can be done in various ways, for example by delaying forwarding the data to the scout slot buffer from a pre-fetch buffer. Then, the data stream can be fetched using a small number of DMA read slots out of the pre-fetch buffer. For direct memory fetches, most of the DMA read slots need to be allocated in order to bridge the long latency of the direct memory fetches. Some DMA read slots, represented by the number x in FIG. 5, may be reserved for other read requests, such as single DMA read requests or multi-CL cache reads. Therefore, those other requests can efficiently bridge the gaps that may occur in the data transfer from memory.

In another embodiment of the invention, an active stream can be retired after all requests have DMA read slots allocated, but before completion of their data transfers. The active-stream arbiter 350 then uses one or more priority list(s) 145 which is/are analyzed by the bus arbiter 140 in order to determine which ready DMA read slots shall be chosen next for the bus-transfer. A ready DMA read slot refers to a slot that has received the requested data from the processor interconnect and is waiting to transfer it to the bus. Therefore, different priority lists can be used, for example one for very small requests such as 2 CL-requests that shall have highest transfer-priority, a high-priority list for requests from a push queue or the device queue and a low-priority queue for requests form the insertion-device queue.

Figure 6:
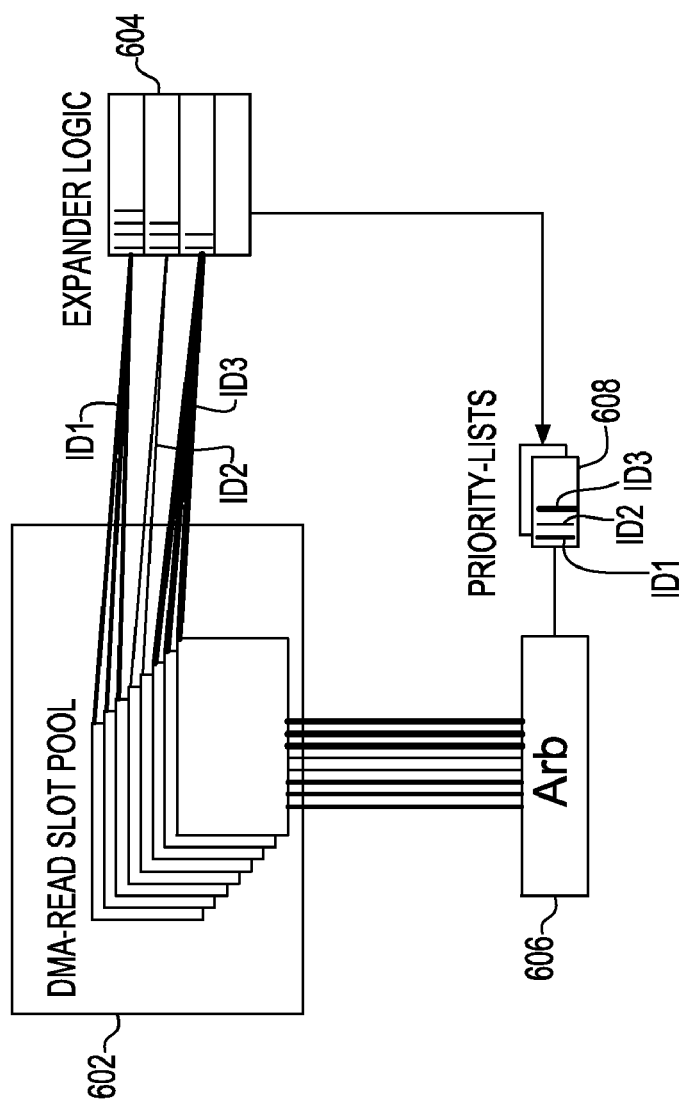
FIG. 6 illustrates priority encoding in one embodiment of the present invention.

FIG. 6 illustrates priority encoding in one embodiment of the present invention. All DMA read slots used by the same expander use the same expander identifier. The respective identifier is also included in the elements on the priority list(s). The identifier in the element with the highest priority is taken by the arbiter 606, and the slots of the DMA-read slot pool 602 are checked for available data for the identifier. If there are no ready requests for the element with the highest priority, the identifier of the element with the next highest priority of the priority list(s) is taken until a slot with available data has been found. Priority list elements are taken off the list when the last DMA transfer for a multi-CL request has been passed on to the external bus and there are thus no more pending transfers for the element.

At the same time the bus-arbiter also has to take into account single CL-reads. Simple round-robin arbitration between single- and multi-CL-requests can be implemented as well as other arbitration schemes, e.g., weighted round robin for giving higher priority to single-CL reads since those are usually used for more important data, for example of contexts and work requests, and are therefore needed in I/O devices more urgently than payload data.

Figure 7:
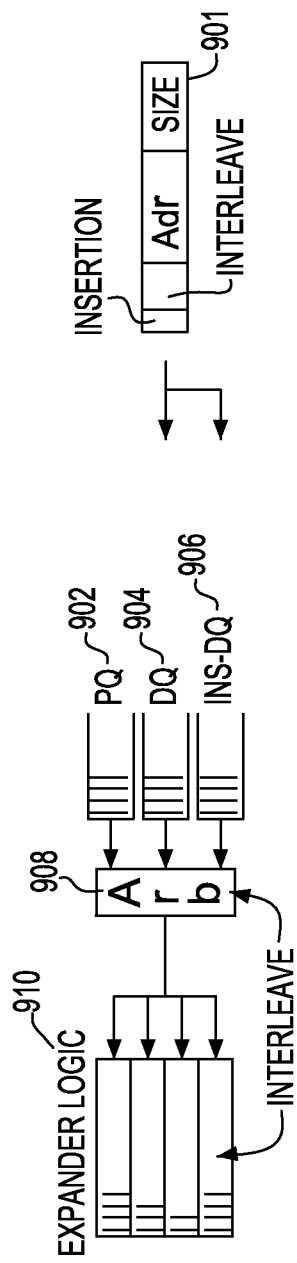
FIG. 7 illustrates the use of insertion indication and interleaving according to one embodiment of the present invention.

According to one embodiment of the present invention, in order to make best use of the optimization possibility of the arbitration of DMA read requests scheduled on an expander slot beyond the packet-level shown in FIGS. 2A and 2B, two indications from the device are provided: an insertion indication and an interleaving indication, as shown in FIG. 7. For network-devices, those indications can be readily generated by the I/O device and forwarded to the I/O controller.

The two indications can be implemented by two identifiers, one indicating if insertion is allowed and the other indicating the total number of allowable interleaves, as shown in FIG. 7, 901. The two indications can also be implemented as one identifier, with an identifier other than zero indicating that insertion is allowed and the number of allowable interleaves. In different types of transfers, one implementation may be more desirable than the other. The indicated allowable interleaving can indicate the absolute number of possible interleaves, the amount of data that may be interleaved, or the maximum time that may pass until the transfer is not interleaved anymore.

In the embodiment illustrated in FIG. 7 of the method and system of the present disclosure, multi-CL read requests are put on one out of three queues 902, 904, 906. Push requests are attached to the push queue 902. Device requests 901 without insertion indication are attached to the device queue 904 and device requests 901 with insertion indication are attached to the insertion device-queue 906. In one embodiment, device queue requests should usually be served with highest priority, then push queue requests and then insertion-device queue requests. In order to avoid starvation of the insertion device queue, the interleave count of those requests is updated (reduced) whenever another request is preferred, in arbitration or in the expander slot as shown in FIG. 7. If an expander slot has finished work and requests arbiter 908 to select a new multi-CL request and a request from either the PQ 902 or DQ 904 is chosen, the interleave count of the first element on the INS-DQ 906 is updated according to the definition of the interleaving indication. If it is specified as number of packets, it is reduced by one, if it is specified as number of bytes possible to interleave, it is decreased by the number of bytes of the preferred request. In the case of a time indication, it is not updated. If the interleave count in the first two cases reaches zero or the maximum time has expired, there is no further possibility to interleave the request and it is chosen in the next arbitration cycle, no matter whether there are pending requests on the higher priority queues. The same update takes place, if a request from queue 906 is already in the expander logic, and a new request replaces it as active stream. When the interleaving indication expires, the stream cannot be interleaved anymore and it will stay as the active stream until it has issued all requests.

In an alternative embodiment, instead of using interleave counts in the normal requests, interleave indications may be used in the high-priority requests. This can be more efficient for allowing the I/O device to counter-act starvation, as low-latency requests are usually processed faster and therefore reflect the current device state more accurately.

Considering upcoming network link speeds, for example, it may be in most cases impossible to provide the packet rates necessary to fill the link with small packets. The device may then alternatingly send high-priority and large requests to fill the network link. In order to not drain the buffers of larger requests, the device can then indicate in high-priority packets, how many requests on the insertion queue shall be finished before the high-priority request is processed.

In one embodiment, to provide best low latency performance and if enough expander slots are available, one or more expander slots can be reserved for use for high priority requests from the push queue or the device queue. If there are no high priority requests pending, the reserved slots are not used. When a new high priority request arrives, it can be scheduled immediately in an expander slot and does not have to wait for an expander slot finishing work on a low-priority request. On the other hand, also a policy in the arbiter 908 may be implemented such that it schedules at least one low level request on an expander slot if there are low level requests pending.

Figure 8:
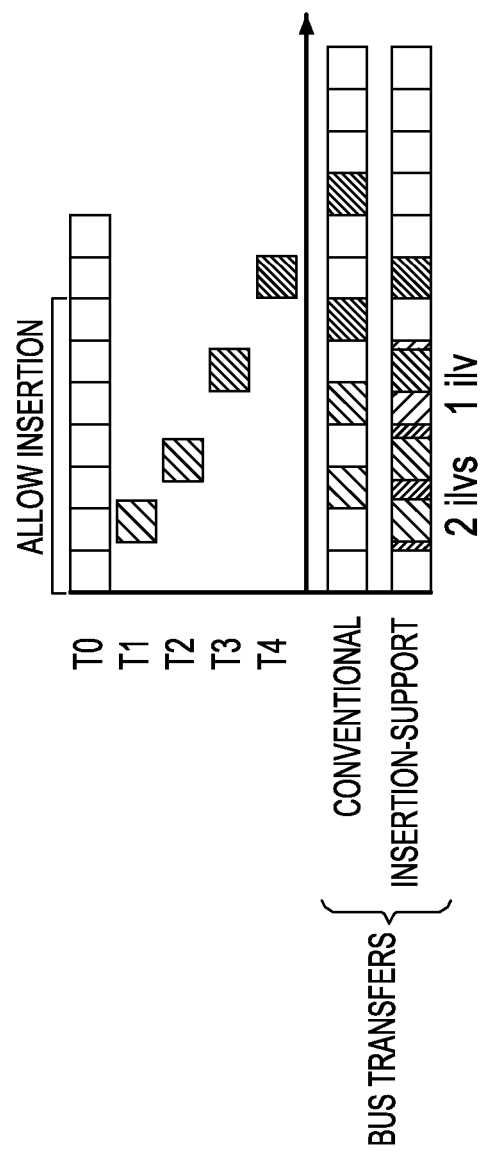
FIG. 8 illustrates the effect of insertion support on the bus transfers for multi-CL transfers.

FIG. 8 illustrates the effect of insertion indication according to one embodiment of the present invention. According to one embodiment of the present invention, data requests may be categorized by the number of requests required to complete processing the transfer. FIG. 8 illustrates five I/O transfers T0-T4. T0 is a low priority request comprising nine packets as payload data, of which insertion is allowed for the first seven packets. T1-T4 are higher priority requests such as a device request or a pushed request that can be transferred in one packet. In this example, T0 arrives first and starts to be processed. T1-T4 which arrive later in the I/O device and require only one packet, are processed by the device in between the packets of T0 to maintain resource usage fairness among requests. Thus, a single requestor cannot monopolize the I/O device processing and link resources. The slot allocation mechanism described above helps in reducing the latency for interleaving requests as it helps to avoid slot-blocking by long-latency memory fetches and multi-cache line requests, as shown in the graph indicating the bus transfers with interleaving support.

Packets are characterized using the insertion indication and the interleaving count for transfer T0, this means that for the first seven data requests it makes no difference in terms of complete transfer latency if there are data requests for the other transfers served before the completion of T0. For the other requests T1-T4 however, their latency can be reduced if they are transferred as fast as possible, interleaving current transfers from T0. The data requests for transfers T1-T4 may either originate from the device queue or the push queue. As shown, an indication from the device about the priority of a data request as to whether it can be delayed or not can reduce the latency for small requests while not affecting the latency for longer transfers.

At the same time, starvation of low priority DMA read requests needs to be avoided. This can be achieved by the interleaving indication in DMA read request. The interleaving indication can reduce wasted resources due to buffer constraints in the device. When a DMA read request for multiple cache lines is issued from a device, it also needs to allocate buffer space such that it is able to accept the data transfers. If there is enough free buffer space, more interleaved transfers are possible than in a situation where there is little buffer space left, because pushed requests or device requests with higher priority also need buffer space in the device. Therefore, if there are too many requests pushed before a device request which allows insertion, there may be an exhaustion of device buffer space and therefore the transferred data has to be discarded in the device and re-fetched, which causes overhead on the external bus.

The proposed method in one embodiment provides the advantage of efficient incorporation of a data-push possibility in the I/O controller. Through the unified use of expander slots for internal and external multi-CL requests also larger amounts of data can be pushed into an I/O-device without creating back pressure into a processing unit. The unified mechanism and the better characterization of device read requests allow optimized merging of the different requests for low-latency operation. Through the use of expander slots and the scout slot operation mechanism, DMA reads can be optimized by taking into account predetermined parameters such as the processor interconnect architecture and available pre-fetching mechanisms as well as changing parameters like the actual origin of the read-data. The slot-usage can be improved allowing for more flexible operation and at the same time reducing the necessity to increase the slot-number in order to bridge increasing worst-case data-latencies in the processor-interconnect.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A system for I/O controller-processor interconnect coupling supporting push-pull DMA operations, comprising:
   a processor interconnect comprising a plurality of caches and memory subsystems;
   an I/O controller coupled with the processor interconnect comprising:
   a plurality of DMA read request queues;
   a DMA read slot pool comprising a plurality of DMA read slots, wherein the DMA read slot pool includes at least a scout slot operable to send a scout request to the processor interconnect inquiring a data origin of a request in said request queues and to notify the data origin to the expander logic in response to receiving a response to the inquiry from the processor interconnect;
   wherein the data origin includes one or more levels of cache memory, memory supporting pre-fetching, memory not supporting pre-fetching, or combinations thereof;
   and an expander logic determining a priority of requests in said request queues.

2. The system of claim 1, wherein the expander logic is operable to determine the priority of the requests according to the response returned from the processor interconnect and information in a slot allocation table.

3. The system of claim 2, wherein the slot allocation table comprises:
   a plurality of data origins of DMA read requests;
   minimum slots allocated to each of the data origins of the DMA read requests, the minimum slots allocated to an inactive request if slots are available in the DMA read slot pool;
   active slots allocated to each of the data origins of the DMA read requests, the active slots allocated to an active request;
   and single request slots allocated to a request if the request is a sole pending request.

4. The system of claim 3, wherein less number of slots are allocated to read requests with cache data origin than read requests with memory data origin that does not support pre-fetching.

5. The system of claim 2, further including a priority encoding providing insertion and interleaving indication used in scheduling.

6. A method of operations using an I/O controller-processor interconnect coupling, comprising:
   receiving a DMA read request;
   selecting a DMA read slot from a plurality to use as a scout slot;
   causing the scout slot to send a request to a processor interconnect to determine data origin of the DMA read request;
   prioritizing the DMA read request according to the determined data origin of the DMA read request, wherein the data origin includes one or more levels of cache memory, memory supporting pre-fetching, memory not supporting pre-fetching, or combinations thereof;
   and allocating a slot of the plurality of slots in a DMA read slot pool according to the prioritizing.

7. The method of claim 6, further including:
   generating a lookup table that allocates the plurality of slots according to the data origin of DMA read requests.

8. The method of claim 7, wherein less number of slots are allocated to read requests having cache data origin than read requests having memory data origin that does not support pre-fetching.

9. A program storage device readable by a machine, tangibly embodying a program of instructions executable by the machine to perform a method of operations using an I/O controller-processor interconnect coupling, comprising:
   receiving a DMA read request;
   selecting a DMA read slot from a plurality to use as a scout slot;
   causing the scout slot to send a request for a processor interconnect to determine data origin of the DMA read request;
   prioritizing the DMA read request according to the determined data origin of the DMA read request, wherein the data origin includes one or more levels of cache memory, memory supporting pre-fetching, memory not supporting pre-fetching, or combinations thereof;
   and allocating a slot of the plurality of slots in a DMA read slot pool according to the prioritizing.

10. The program storage device of claim 9, further including:
    generating a lookup table that allocates the plurality of slots according to the data origin of DMA read requests.

11. The program storage device of claim 10, wherein less number of slots are allocated to read requests having cache data origin than read requests having data origin that do not support pre-fetching.

* * * * *